United States Patent
Lovie et al.

(10) Patent No.: US 7,162,128 B2
(45) Date of Patent: Jan. 9, 2007

(54) USE OF BUFFER TUBE COUPLING COIL TO PREVENT FIBER RETRACTION

(75) Inventors: Ray Lovie, Hickory, NC (US); Olaf Storaasli, Hickory, NC (US)

(73) Assignee: Drake Comteq B.V., Amsterdam (NL)

( * ) Notice: Subject to any disclaimer, the term of this patent is extended or adjusted under 35 U.S.C. 154(b) by 0 days.

(21) Appl. No.: 11/041,373

(22) Filed: Jan. 25, 2005

(65) Prior Publication Data

US 2005/0163440 A1   Jul. 28, 2005

Related U.S. Application Data

(60) Provisional application No. 60/538,509, filed on Jan. 26, 2004.

(51) Int. Cl.
*G02B 6/44* (2006.01)

(52) U.S. Cl. .................. 385/100; 385/101; 385/102; 385/103; 385/109

(58) Field of Classification Search .................. 385/100
See application file for complete search history.

(56) References Cited

U.S. PATENT DOCUMENTS 6,379,166 B1 *   4/2002   Hagarty et al. ............. 439/135
6,459,837 B1    10/2002   Fitz et al.
6,909,829 B1 *   6/2005   Register et al. ............. 385/114

FOREIGN PATENT DOCUMENTS

EP        1359109        11/2003

OTHER PUBLICATIONS

Patent Abstracts of Japan Publication No. 2002311315, Oct. 23, 2002; Kyushu Uchida Tanko K.K.
Optical Fiber Cables for Residential and Business Premises; Hogari, et al.; XP-000750659, vol. 16, No. 2, Feb. 1998.

* cited by examiner

*Primary Examiner*—Jennifer Doan
(74) *Attorney, Agent, or Firm*—Sughrue Mion, PLLC

(57) ABSTRACT

A method of installing a cable including at least one communication element, such as an optical fiber, disposed in a buffer tube and a surrounding jacket. The method includes the steps of exposing a portion of the buffer tube over a predetermined length and forming the exposed portion of the buffer tube into a coupling coil having at least one loop. The cable installation method prevents fiber retraction in cable terminations by utilizing at least one coupling coil formed from the exposed buffer tube and advantageously yields coupling coil terminations with small diameter coils, requiring less cable for more efficient installation, and further provides for the coupling coil to be located within a splice closure for more visually pleasing terminations. Preferably, coupling coils are formed at each end of the cable and located in splice enclosures.

26 Claims, 6 Drawing Sheets

USE OF BUFFER TUBE COUPLING COIL TO PREVENT FIBER RETRACTION

CROSS-REFERENCE TO RELATED APPLICATIONS

The present application claims priority to U.S. provisional application No. 60/538,509, filed Jan. 26, 2004, the disclosure of which is hereby incorporated by reference thereto in its entirety, and the priority of which is claimed under 35 U.S.C. § 119(e).

BACKGROUND OF THE INVENTION

The present invention relates to the termination of fiber optic cable by a buffer tube coupling coil to couple the fiber with the buffer tube, thereby preventing fiber retraction.

Fiber retraction refers to the movement of fibers into a cable when the cable is subjected to a tensile load. Fiber retraction occurs when fibers are not properly coupled to the cable. As the cable stretches longitudinally, the fibers want to remain in their un-strained state, and if they are not sufficiently coupled to the cable, the ends of the fibers retract into the cable.

Fiber retraction most commonly occurs in central tube fiber optic cable. A central tube cable typically consists of loose fibers within a buffer tube in the center of the cable. Strength members are usually located outside the buffer tube, typically embedded in the outer jacket. A central tube cable can also consist of multiple fiber bundles, ribbons, or even smaller buffer tubes. Many times this central buffer tube is called a core tube, core buffer tube or even an inner jacket.

When a cable is installed between termination points, the cable is subject to tension. One such installation is an aerial installation, where the cable is subject to tension due to the weight of the cable as well as other loads due to wind and ice build-up on the cable. When subjected to these loads, the cable elongates. The strength members in the cable control the amount of elongation. If the components within the cable are properly coupled together, they will all strain in equal amounts. The strength members, jacket, buffer tube(s) and fibers will all strain equally. However, if the components are not coupled together, it is possible that the components can behave differently from each other. It is possible for the cable components to move relative to each other in order to relieve the strain. A common example is a central tube cable with loose fibers in a central buffer tube. The fibers are typically loosely embedded in a filling gel within that buffer tube.

In FIGS. 1A–1C, the interaction between the fiber 10 and the cable 12 is demonstrated. In FIG. 1A, the case is presented where there is no tension on the cable 12. Here, both the cable strain and the fiber strain are equal to zero. Note that the lengths of the cable and fiber are equivalent in this state. Turning to FIG. 1B, the case is presented where the cable is under tension and the fiber 10 and cable 12 are sufficiently coupled together. In this case, the cable has elongated as a result of the tension force by an amount 14. However, because the fiber and cable are sufficiently coupled, the cable strain is equivalent to the fiber strain. Thus, the relative length of the fiber to the cable remains unchanged, and no retraction is observed. Finally, in the case of FIG. 1C, the fiber 10 and cable 12 are not sufficiently coupled together. As a result, when the tension force is applied, the cable elongates by an amount 16, but the fiber does not elongate by the same amount. This lack of adequate coupling leads to the fiber retracting into the cable.

Fiber retraction can lead to significant disruptions in network function. In the case of aerial installations, the ends of the cable segments are connected to a splice closure. Strength members secure the cable to the closure. When tensile load is applied to the cable due to sag, wind, ice, or some other means, the load is designed to be taken by the strength members. If the fibers are not sufficiently coupled to the cable, the fibers are free to move axially within the central cavity of the cable. If the fibers can move freely, this can result in the fibers being pulled out of splice closures as they retract into the cable. This causes problems with the splice closures and severely, if not detrimentally, affects optical performance of the fiber and cable.

Several methods have been developed to prevent fiber retraction. Such methods include the application of glue-type sealant at the ends of the cable to bond the cable components together, leaving extra slack in the splice closures to compensate for the retractions, and the use of coupling coils. However, each of these conventional methods has their own negative implications.

More specifically, one of the conventional approaches previously used to address the problem of fiber retraction is to implement coupling coils which involves forming a portion of the cable into a loop or a plurality of loops. This results in frictional coupling of the internal fibers to the buffer tube to prevent the fiber from moving relative to the other members of the cable. However, because the minimum bend radius of the cable is dictated by the external members of the cable, such as the jacket and strength members, conventional coupling coils can be quite large and bulky. These conventional coupling coils typically exceed well over 1 foot in diameter. Such large coupling coils are undesirable since they are visually unpleasing in applications where cable is installed in residential areas, such as a fiber to the home installation. Further, in many cases, it is not possible to make large coils on telephone poles or lines due to proximity to other cables and/or right of way restrictions. Moreover, conventional coils require a significant length of cable to be utilized to form the large diameter coil, which results in increased installation expense.

Thus, it is desirable to prevent fiber retraction by achieving coupling between the fiber and the cable without the drawbacks associated with conventional approaches.

SUMMARY OF THE INVENTION

The present invention is directed towards a method of installing a cable including a communication member, such as an optical fiber, disposed in a buffer tube and a jacket surrounding the buffer tube. The method comprises the steps of exposing a portion of the buffer tube over a predetermined length; and forming the exposed portion of the buffer tube into a first coupling coil having at least one loop. Preferably, coupling coil is located in proximity to a first end of the cable such that it can be disposed in a splice enclosure. The method may also include the step of exposing a second portion of the buffer tube over a predetermined length and forming the exposed second portion of the buffer tube into a second coupling coil having at least one loop. The second coupling coil is also preferably disposed in at the opposite end of the cable and positioned inside a second splice enclosure.

The cable of the present invention preferably includes the first and second coupling coils located in the splice enclosures. Advantageously, the present invention provides a coupling coil with a significantly smaller diameter than prior methods. Further, the smaller coupling coil can be placed inside a closure to provide a more visually pleasing cable termination. Cable terminations according to the present invention also yield savings in time and effort, and further require less cable in their installation.

These and other features, aspects, and advantages of the present invention will become better understood with reference to the following description and appended claims.

DETAILED DESCRIPTION OF THE INVENTION

Figure 1A:
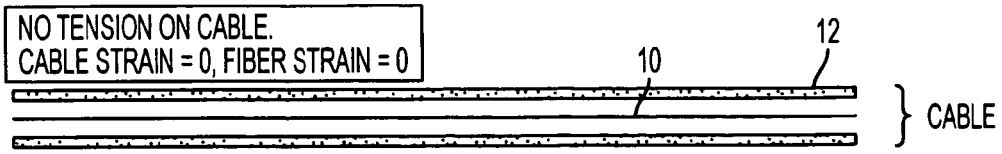
FIGS. 1A–1C shows a fiber optic cable and the effect of tension on the cable when coupling is and is not present.
Figure 1B:
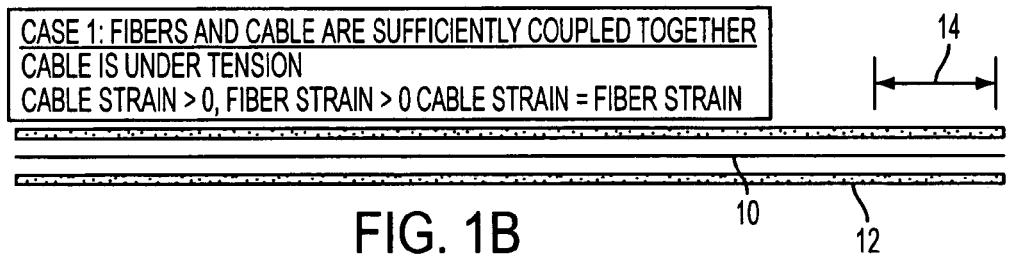
Figure 1C:
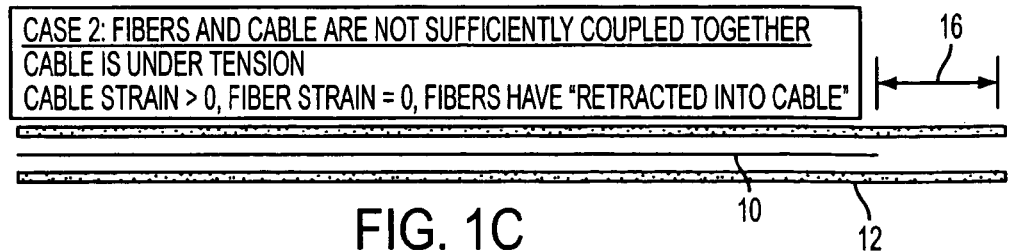
Figure 2:
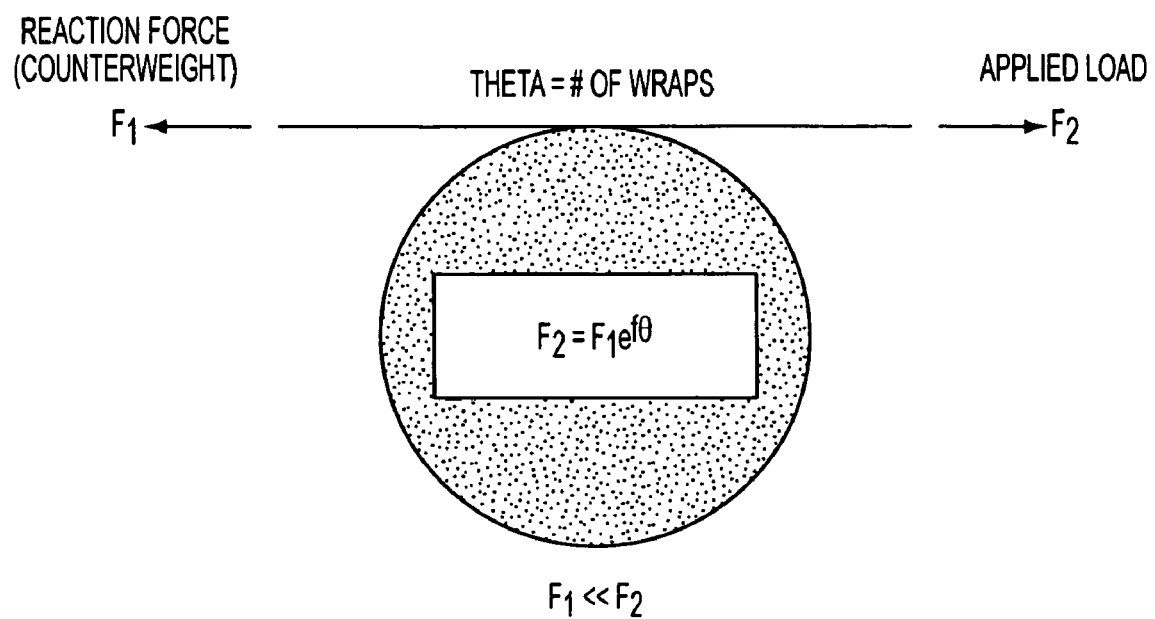
FIG. 2 shows a coupling coil with the forces involved in a cable termination.

The present invention will now be described with reference to FIGS. 2–4. Fiber retraction can be prevented in cable installations by utilizing coupling coils, preferably located in terminations or splice closures. Coupling coils operate under the principal of utilizing sidewall friction of a coil, often times termed the capstan effect. The capstan effect is demonstrated in FIG. 2, where the reaction force $F_1$ required to counteract the applied load $F_2$ is exponentially related to friction factor (f) and number of wraps ($\theta$). This relationship can be expressed as $F_2 = F_1 e^{f\theta}$.

Figure 3A:
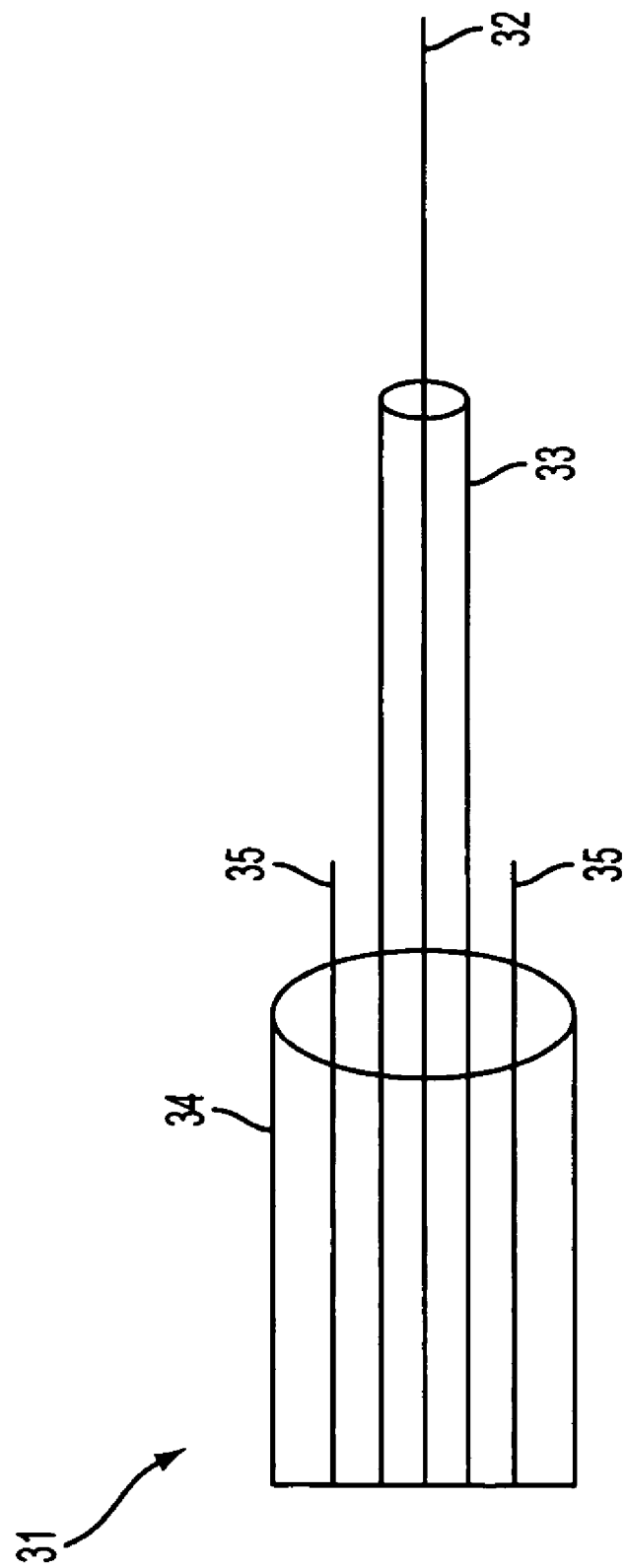
FIGS. 3A and 3B show detail of a fiber optic cable and a coupling coil termination according to the present invention.
Figure 3B:
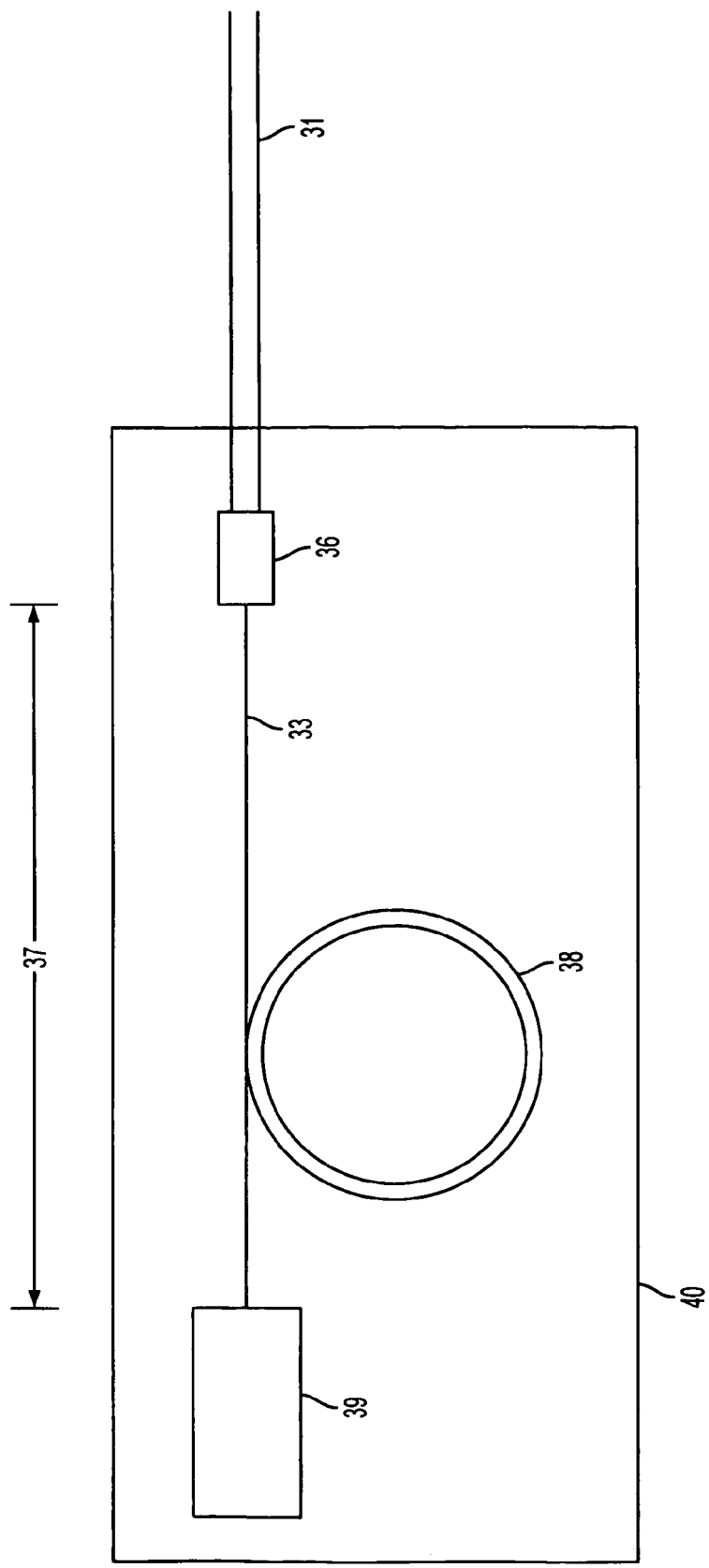

FIGS. 3A and 3B show a cable according to the present invention. The components of a fiber optic cable are described with respect to FIG. 3A. Fiber optic cable 31 includes at least one fiber 32 disposed in a buffer tube 33 and a jacket 34 surrounding the buffer tube. The cable may also include strength members 35 which assist in transferring the load on the cable 31 and may be used to secure the cable to a termination point.

Turning to FIG. 3B, the termination of a fiber optic cable according to the present invention is presented. Cable 31 is attached to a wedge clamp 36 to support the cable weight. For example, the clamp 36 may clamp the strength member(s) of the cable. Although a wedge clamp is shown, other methods of supporting the cable weight may be employed, including methods which attach to strength members of the cable.

A portion of the buffer tube 33 is exposed over a predetermined length 37. The manner of exposing the buffer tube should not damage the buffer tube or any fibers disposed within. The length chosen is not critical but should be chosen with consideration of the length required for the coil to be formed and the length required for the end of the fiber to be terminated. If the cable includes any external members in addition to the jacket, such as strength members and armor, these members should be removed during the exposure of the buffer tube.

The exposed portion of the buffer tube 33 is formed into a coupling coil 38 having at least one loop. Coupling coil 38 can be formed by winding the predetermined length 37 of the buffer tube 33 into a plurality of loops of substantially equal diameter. The use of multiple loops increases the coupling effect. The coupling coil 38 may be secured with at least one fastener (not shown). The precise location where coupling coil 38 is formed is not critical. However, it is preferable that the coupling coils be located at the ends of the cable so that they can be received in the splice enclosures, as discussed below. Additionally, more than one coupling coil may be formed at each termination. Furthermore, coupling coils according to the present invention may be located at any point on the cable if the weight of the cable is adequately supported.

Figure 5:
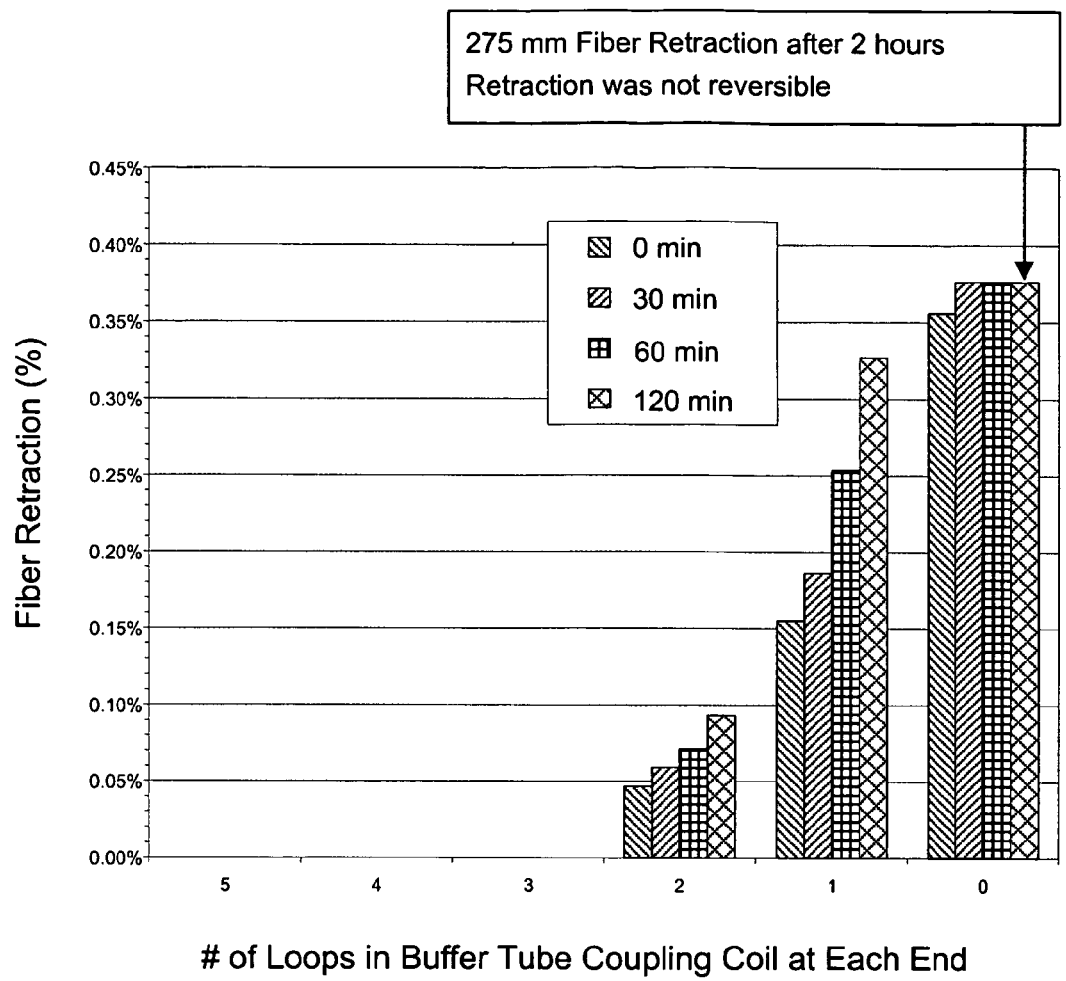
FIG. 5 shows results of fiber retraction observed with zero to five buffer tube coupling coils.
Figure 5:
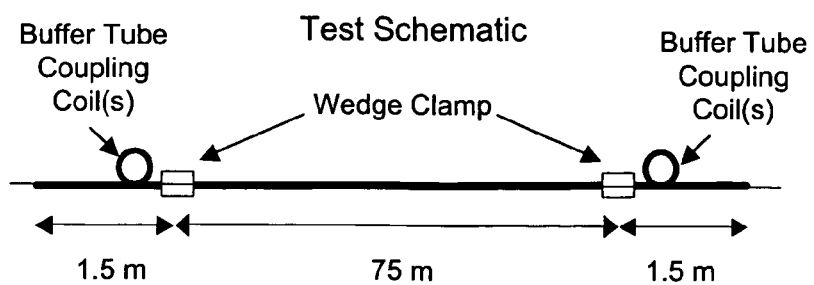

As mentioned previously, the coupling effect achieved by coupling coils is related to the number of loops in the coupling coil. This effect is demonstrated with reference to FIG. 5, which depicts the fiber retraction observed without buffer tube coupling coils and when buffer tube coupling coils of 1 to 5 loops are employed in a cable termination with a coupling coil formed at each end of the cable, as shown. The horizontal axis of the chart shown in FIG. 5 shows the number of loops formed in each coupling coil, ranging from zero loops (no coupling coils) to coupling coils with 5 loops, and the vertical axis depicts the percentage of fiber retraction observed. Results are provided for the fiber retraction observed at zero minutes, 30 minutes, 60 minutes, and 120 minutes. In the case where no coupling coils at all are used (zero loops), a substantial fiber retraction of 0.38% occurs at 120 minutes. This retraction is irreversible. In the case of buffer tube coupling coils with a single loop, a significantly smaller percentage of fiber retraction occurs, wherein the percentage of fiber retraction is 0.33% at 120 minutes. Further, when buffer tube coupling coils with two loops are utilized, the fiber retraction observed at 120 minutes is less than 0.10%. Finally, in the case of coupling coils with three to five loops, no fiber retraction occurs.

Referring again to FIG. 3B, the fiber (or fibers) disposed within the exposed buffer tube 33 is terminated at a first termination 39. The coupling coil 38 may advantageously be located within a splice closure 40 to hide the termination in installations where visually pleasing installations are desirable, such as in residential areas for fiber to the home installations.

Figure 4:
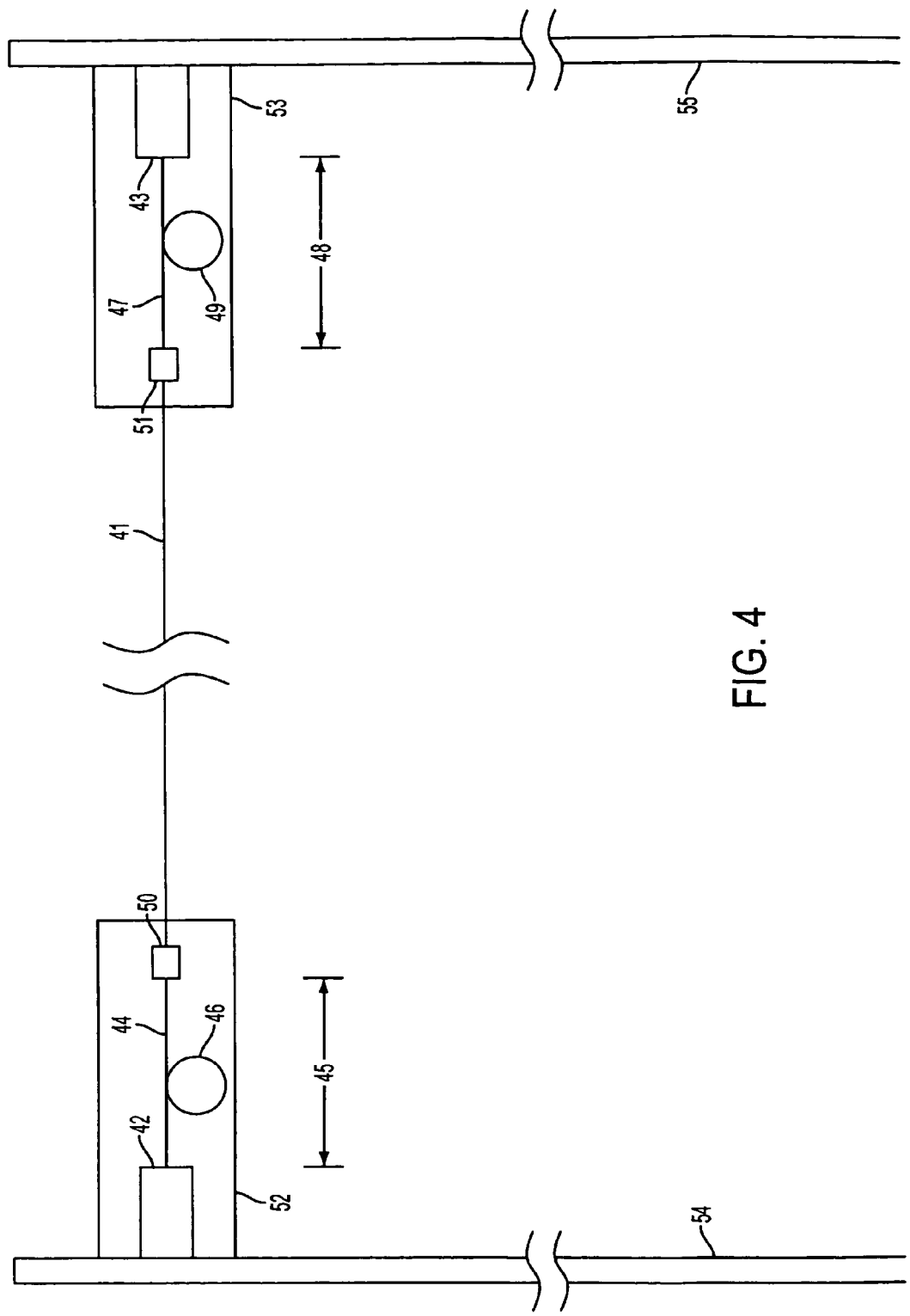
FIG. 4 shows a cable installation wherein the cable is aerially suspended between termination points with two coupling coils.

FIG. 4 shows an aerial installation, wherein cable 41 is suspended between a first termination point 42 and a second termination point 43. Cable 41 is a fiber optic cable suitable for aerial installations with a similar structure to the fiber optic cable described in FIG. 3A, where the structure of the cable comprises at least one fiber disposed in a buffer tube and a jacket surrounding the buffer tube with strength member(s) which assist in transferring the load on the cable. A further example of a fiber optic cable for use in aerial installations is described in U.S. Pat. No. 6,459,837 to Fitz et al., the disclosure of which is hereby incorporated in its entirety.

Returning to FIG. 4, further details of the aerial installation are provided wherein a first portion of the buffer tube 44 of cable 41 is exposed over a predetermined length 45. The exposed first portion of the buffer tube 44 is formed into a first coupling coil 46 having at least one loop. Further, a second portion of the buffer tube 47 is exposed over a second predetermined length 48. The exposed second portion of the buffer tube 47 is formed into a second coupling coil 49. As in the previous case, coupling coils 46 and 49 may be formed by winding the exposed portion of the buffer tube 44 and 47 into a plurality of loops of substantially equal diameter.

Further, as discussed above, cable 41 is attached to wedge clamps 50 and 51 to support the weight of the cable. As stated previously, other methods of supporting the weight of the cable may be employed. At the end of the first portion of the buffer tube 46, fiber or fibers disposed within the buffer tube are terminated at a first termination 42. Likewise, at the end of the second portion of the buffer tube 47, fiber or fibers disposed within the buffer are terminated at a second termination 43.

A first splice closure 52 may enclose first termination 42, first coupling coil 46 and wedge 50. Similarly, a second splice closure 53 may enclose second termination 43, second coupling coil 49 and wedge 51. First splice closure 52 may be mounted on utility pole 54 and second splice closure 53 may be mounted on utility pole 55 to suspend cable 41.

As can be appreciated from the foregoing, the present invention involves the use of buffer tube coupling coils formed by winding the buffer tube into small coils. These buffer tube coils are significantly smaller than conventional coupling coils because the coils are formed without the external members of the cable. Because of the small size of the buffer tube coupling coils, they can be easily stored within a splice closure to provide a more visually appealing termination.

The buffer tube coupling coil works on the same principle as the cable coupling coil. Because the relative movement is between the fibers and the buffer tube, only these two components are required to be in a coil. Taking advantage of the observation that the other components such as the jacket, armor, and strength members need not be in the coil to achieve coupling, the coil diameter is limited only by the minimum allowable bend radius of the fiber and buffer tube.

Typically, fibers are limited to a 1 inch bend radius or a 2 inch bend diameter. Cables, however, usually have a minimum bend radius of 10 times their diameter. Armored cables require even larger bend radii. For a 1 inch diameter cable, the minimum cable bend radius would be 10–20 inches or more. Thus, a buffer tube coupling coil that can achieve the coupling needed to prevent fiber retraction without the substantial coil diameter of conventional coupling coils is highly desirable.

The fibers are coupled to the buffer tube by the friction between the fibers and the inner walls of the buffer tube. As with a conventional cable coil, in a buffer tube coil, the friction force holding the components together increases exponentially with the number of loops within the coil. Thus, the coupling force of a conventional cable coil and a buffer tube coil are theoretically equivalent.

In some fiber optic cables, the fibers are disposed within a buffer tube, and the buffer tube is filled with a gel substance. However, the use of buffer tube coupling coils is not limited to loose fibers in a gel-filled buffer tube. This method can also be used in a dry buffer tube, for ribbons in a dry buffer tube, for ribbons in a gel-filled buffer tube, for multiple fiber bundles in a buffer tube, for miniature buffer tubes in a larger buffer tube, and other applications. It is believed that fiber retraction is a potential problem for all non-stranded fiber-optic cables where the buffer tube and/or fiber length is the same as the cable length. If the fibers are not sufficiently coupled to the cable, retraction can occur.

The buffer tube coupling coil would typically be formed by hand-winding the required length of buffer tube into loose, unsupported loops of substantially equal diameter. Alternatively, the buffer tube coupling coil could be formed by winding the required length of buffer tube around a supporting mandrel or ring. The mandrel or ring could be removed after the coupling coil is formed, or could remain in place to help prevent kinking or collapse of the tube coils.

A number of techniques could be used to secure the loops together (to keep the coupling coil from un-coiling), or to secure the loops to the mandral or ring (if used). These techniques may include adhesive tape, tie wraps, shrink wraps, spiral wraps and the like. At least one fastener may be used to secure the coupling coil, and multiple fasteners may be employed at different locations of the coil to secure it. Regardless of the securing technique employed, it should be non-damaging to the buffer tube material or structure.

Applications of the present invention are not limited to fiber optic cables with fiber disposed within a buffer tube. It is contemplated that the present invention is equally applicable to other types of cable installations other than optical fiber cables. The present invention contemplates termination of any cable including at least one internal member disposed within a central tube and an external member surrounding the tube, wherein the method comprises the steps of exposing a portion of the central tube to be over a predetermined length, and forming the exposed portion of the central tube into a coupling coil having at least one loop. The forming step can include forming the coupling coil in the proximity of an end of the cable.

The present invention provides numerous advantages over prior approaches discussed in the background. Among these are small size, where a buffer tube coupling coil may be more than 10 times smaller than a conventional cable coupling coil. Further, buffer tube coupling coils can be placed into closures and out of sight. Because of their very small size, buffer tube coupling coils can be easily placed in the closures at either end of the cable. Also, the smaller buffer tube coupling coil is very easy to make in comparison to making the much larger cable coupling coils.

Additionally, significantly less cable is required to make a buffer tube coupling coil. For example, for a 1 inch cable, approximately 20 feet of extra cable is needed to make a cable coupling coil, where only 2 feet of extra buffer tube is needed to make a buffer tube coupling coil with four loops. The buffer tube coupling coil achieves the same effect of preventing fiber retraction as the conventional coupling coil with less cable required, thereby providing significant economic benefits to the installer.

Furthermore, buffer tube coupling coils can be used for multiple designs, such as fibers in a dry tube, ribbon in a dry tube, ribbon in a gel-filled buffer tube, multiple fiber bundles in a dry or gel-filled buffer tube, miniature buffer tubes in a larger buffer tube, and others.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method of installing a fiber optic cable including at least one fiber disposed in a buffer tube and a jacket surrounding the buffer tube, the fiber optic cable having a minimum bend radius, the method comprising the steps of:
   exposing a portion of the buffer tube over a predetermined length; and
   forming the exposed portion of the buffer tube into a first coupling coil having at least one loop having a radius which is smaller than the minimum bend radius of the optical fiber cable.

2. The method of claim 1, wherein said forming step includes forming the first coupling coil in proximity to a first end of the cable.

3. The method of claim 1, further comprising the steps of exposing a second portion of the buffer tube over a predetermined length and forming the exposed second portion of the buffer tube into a second coupling coil having at least one loop.

4. The method of claim 3, wherein said forming steps includes forming the first coupling coil in proximity to a first end of the cable and forming the second coupling coil in proximity to a second end of the cable.

5. The method of claim 4, further comprising the step of suspending the cable between a first termination point and a second termination point respectively defined by first and second splice closures.

6. The method of claim 5, wherein the first coupling coil is located within the first splice enclosure and the second coupling coil is located within the second splice closure.

7. The method of claim 6, wherein the fiber optic cable further comprises at least one strength member, and wherein the method further comprises the step of removing the strength member over the predetermined length.

8. The method of claim 1, wherein said forming step includes the step of winding a length of the fiber optic cable into a plurality of loops of substantially equal diameter.

9. A fiber optic cable, comprising:
    at least one optical fiber;
    a buffer tube in which said optical fiber is disposed;
    a jacket surrounding the buffer tube, said buffer tube including an exposed portion which is exposed to outside said jacket over a predetermined length; and
    a coupling coil, having at least one loop, formed from the exposed portion of the buffer tube, wherein the fiber optic cable has a minimum bend radius and wherein the at least one loop has a radius that is smaller than the minimum bend radius of the fiber optic cable.

10. The cable of claim 9, wherein said coupling coil is formed in proximity to an end of the cable.

11. The cable of claim 9, wherein said exposed portion is a first exposed portion and wherein the buffer tube includes a second exposed portion extending a predetermined length, said second exposed portion including a second coupling coil having at least one loop formed therein.

12. The cable of claim 11, wherein said first coupling coil is formed in proximity to a first end of the cable and said second coupling coil is formed in proximity to a second end of the cable.

13. The cable of claim 12, wherein the cable is suspended between the first and second ends of the cable.

14. The cable of claim 13, further comprising first and second splice closures in which said first and second coupling coils are respectively disposed.

15. The cable of claim 14, further comprising at least one strength member disposed inside said jacket, said strength member being removed for the length of the fiber optic cable comprising the first and second coupling coils.

16. The cable of claim 11, wherein said first and second coupling coils comprises a plurality of loops.

17. A method of installing a fiber optic cable including at least one fiber disposed in a buffer tube and a jacket surrounding the buffer tube, the method comprising the steps of:
    exposing a first portion of the buffer tube over a predetermined length;
    forming the first exposed portion of the buffer tube into a first coupling coil having at least one loop; and
    exposing a second portion of the buffer tube into a second coupling coil having at least one loop.

18. The method of claim 17, wherein said forming steps includes forming the first coupling coil in proximity to a first end of the cable and forming the second coupling coil in proximity to a second end of the cable.

19. The method of claim 18, further comprising the step of suspending the cable between a first termination point and a second termination point respectively defined by first and second splice closures.

20. The method of claim 19, wherein the first coupling coil is located within the first splice enclosure and the second coupling coil is located within the second splice closure.

21. The method of claim 20, wherein the fiber optic cable further comprises at least one strength member, and wherein the method further comprises the step of removing the strength member over the predetermined length.

22. A fiber optic cable, comprising:
    at least one optical fiber;
    a buffer tube in which said optical fiber is disposed;
    a jacket surrounding the buffer tube, said buffer tube including an exposed portion which is exposed to outside said jacket over a predetermined length; and
    a coupling coil, having at least one loop, formed from the exposed portion of the buffer tube, wherein said exposed portion is a first exposed portion and wherein the buffer tube includes a second exposed portion extending a predetermined length, said second exposed portion including a second coupling coil having at least one loop formed therein.

23. The cable of claim 22, wherein said first coupling coil is formed in proximity to a first end of the cable and said second coupling coil is formed in proximity to a second end of the cable.

24. The cable of claim 23, wherein the cable is suspended between the first and second ends of the cable.

25. The cable of claim 24, further comprising first and second splice closures in which said first and second coupling coils are respectively disposed.

26. The cable of claim 25, further comprising at least one strength member disposed inside said jacket, said strength member being removed for the length of the fiber optic cable comprising the first and second coupling coils.

* * * * *